(12) United States Patent
Strong et al.

(10) Patent No.: US 7,830,648 B2
(45) Date of Patent: Nov. 9, 2010

(54) TAP APPARATUS FOR ELECTRICALLY INTERCONNECTING AN ELECTRICAL BUSWAY AND SWITCHGEAR, AND SYSTEM INCLUDING THE SAME

(75) Inventors: Ryan J. Strong, Orlando, FL (US); Mark T. Teaken, Winter Park, FL (US)

(73) Assignee: Eaton Corporation, Cleveland, OH (US)

( * ) Notice: Subject to any disclaimer, the term of this patent is extended or adjusted under 35 U.S.C. 154(b) by 40 days.

(21) Appl. No.: 12/352,158

(22) Filed: Jan. 12, 2009

(65) Prior Publication Data

US 2010/0177464 A1    Jul. 15, 2010

(51) Int. Cl.
  *H01R 9/22*    (2006.01)
(52) U.S. Cl. ............... 361/624; 361/605; 361/611; 361/637; 361/648; 174/40 R; 174/71 B; 174/99 B
(58) Field of Classification Search .............. 361/600, 361/601, 605, 607, 611, 622, 624, 627, 631, 361/633–637, 639–648, 670, 673–675; 174/71 B, 174/40 R, 99 B, 95, 481, 88 B, 480, 101; 312/223.2, 223.3; 439/709, 711–715, 719, 439/721–724, 507, 511, 510, 114, 814, 716, 439/488, 122, 213
See application file for complete search history.

(56) References Cited

U.S. PATENT DOCUMENTS

| | | | | |
|---|---|---|---|---|
| 2,641,636 A | * | 6/1953 | Born et al. ............... | 361/675 |
| 2,970,245 A | * | 1/1961 | Weimer .................... | 361/656 |
| 3,148,312 A | * | 9/1964 | Fouse ...................... | 361/675 |
| 3,287,487 A | | 11/1966 | Fehr, Jr. | |
| 3,482,202 A | * | 12/1969 | Hamilton, Jr. et al. ..... | 439/114 |
| 3,744,002 A | * | 7/1973 | Weimer et al. ........... | 174/71 B |
| 3,884,541 A | * | 5/1975 | O'Nan et al. ............. | 439/122 |
| 4,097,103 A | * | 6/1978 | Krause .................... | 439/213 |
| 5,011,421 A | * | 4/1991 | Duke et al. ............... | 439/213 |
| 5,895,279 A | | 4/1999 | Petrisko et al. | |
| 6,835,104 B2 | * | 12/2004 | West et al. ............... | 439/709 |
| 2010/0059276 A1 | * | 3/2010 | Bhathija et al. .......... | 174/99 B |

OTHER PUBLICATIONS

Eaton Corporation, "LUX Lighting Trunking Range", http://www.memonline.com/lux.html, 2007, 6 pp.
Eaton Corporation, Group Metering & Meter Breakers, CA08101001E, Jul. 2007, 94 pp.

* cited by examiner

*Primary Examiner*—Michael V Datskovskiy
(74) *Attorney, Agent, or Firm*—Martin J. Moran

(57) ABSTRACT

A system includes an electrical busway, an electrical enclosure enclosing an electrical apparatus, the electrical enclosure including an interior and a mounting portion with an opening therethrough; and a tap apparatus electrically interconnecting the electrical busway and the electrical apparatus. The tap apparatus includes a first portion electrically interconnected with the electrical busway through the opening of the mounting portion, a second portion removeably coupled to the mounting portion of the electrical enclosure from the interior of the electrical enclosure, and a third portion including a flexible electrical connection electrically interconnected with the electrical apparatus.

6 Claims, 8 Drawing Sheets

TAP APPARATUS FOR ELECTRICALLY INTERCONNECTING AN ELECTRICAL BUSWAY AND SWITCHGEAR, AND SYSTEM INCLUDING THE SAME

BACKGROUND

1. Field

The disclosed concept pertains generally to electrical busways and, more particularly, to tap apparatus for such electrical busways. The disclosed concept also pertains to systems including an electrical busway and an electrical enclosure electrically interconnected with the electrical busway.

2. Background Information

Various electrical components are defined by, and subject to, regulatory requirements. For example and without limitation, the Underwriter's Laboratory (UL) defines an "electrical busway", at UL 857, as a grounded metal enclosure containing factory mounted conductors that are usually copper or aluminum bars, rods, or tubes. Similarly, the National Electric Code (NEC) defines an electrical busway as a grounded metal enclosure containing factory mounted, bare, or insulated conductors, which are usually copper or aluminum bars, rods, or tubes.

Typically, electrical busways include a plurality of electrical conductors (e.g., wires, cables or other suitable conductive members made from an electrically conductive material such as, for example and without limitation, copper or aluminum) that are insulated by a coating, film or sleeve of a non-conductive material (e.g., an electrical insulator) and enclosed in a housing, such as an elongated rail structure. The electrical conductors of the electrical busway receive, for example, different phases of alternating current power that power electrical equipment, which is electrically connected to the electrical busway.

In order to electrically connect a busway (e.g., without limitation, including three phases and neutral; three phases, neutral and ground) to switchgear (e.g., without limitation, an electrical enclosure), the busway is tapped by a conventional bus plug and an electrical contractor uses conventional conduits and electrical conductors to feed plural power conductors from the bus plug to the switchgear (e.g., to the main circuit breaker thereof). This, however, has various disadvantages associated with corresponding labor and equipment costs, as well requiring dozens of square feet of space for that equipment.

Known residential meter stacks employ a non-removable busway tap that is fixed to one side of a meter main disconnect stack, which includes a plurality of main disconnect stackable modules. A rigid internal electrical bus connection is employed from the busway tap to an internal disconnect in the main disconnect stackable module. From there, the main disconnect stackable module is hard bussed to a second stackable module, which, in turn, can be hard bussed to a third stackable module. Additional stackable modules can be added, as needed, starting at the third stackable module. Such residential meter stacks are hard connected to the busway and must be plugged into the busway as a unit. Since known busways have a limited number of fixed locations, which can be tapped, and since the location of the busway tap of the main disconnect stackable module is fixed by the rigid internal electrical bus connection, the busway must be pre-defined in all three dimensions (e.g., x, y and z) to meet the requirements of such residential meter stack.

There is room for improvement in tap apparatus for electrical busways.

There is also room for improvement in systems including an electrical busway and an electrical enclosure electrically interconnected with the electrical busway.

SUMMARY

These needs and others are met by embodiments of the disclosed concept, which provide a tap apparatus comprising a first portion structured to electrically interconnect with an electrical busway through an opening of a mounting portion of a switchgear enclosure or other electrical enclosure, a second portion structured to be removeably coupled to the mounting portion of the enclosure from the interior of the enclosure, and a third portion including a flexible electrical connection structured to electrically interconnect with the switchgear or other electrical apparatus.

In accordance with one aspect of the disclosed concept, a tap apparatus is for electrically interconnecting an electrical busway and switchgear, the switchgear includes an enclosure having an interior and a mounting portion with an opening therethrough. The tap apparatus comprises: a first portion structured to electrically interconnect with the electrical busway through the opening of the mounting portion; a second portion structured to be removeably coupled to the mounting portion of the enclosure from the interior of the enclosure; and a third portion including a flexible electrical connection structured to electrically interconnect with the switchgear.

As another aspect of the disclosed concept, a system comprises: an electrical busway; an electrical enclosure enclosing an electrical apparatus, the electrical enclosure including an interior and a mounting portion with an opening therethrough; and a tap apparatus electrically interconnecting the electrical busway and the electrical apparatus, the tap apparatus comprising: a first portion electrically interconnected with the electrical busway through the opening of the mounting portion, a second portion removeably coupled to the mounting portion of the electrical enclosure from the interior of the electrical enclosure, and a third portion including a flexible electrical connection electrically interconnected with the electrical apparatus.

The second portion may be structured to be uncoupled from the mounting portion of the electrical enclosure from the interior of the electrical enclosure, in order to remove the tap apparatus, position the electrical enclosure with respect to the electrical busway, and recouple the second portion to the mounting portion of the electrical enclosure from the interior of the electrical enclosure.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
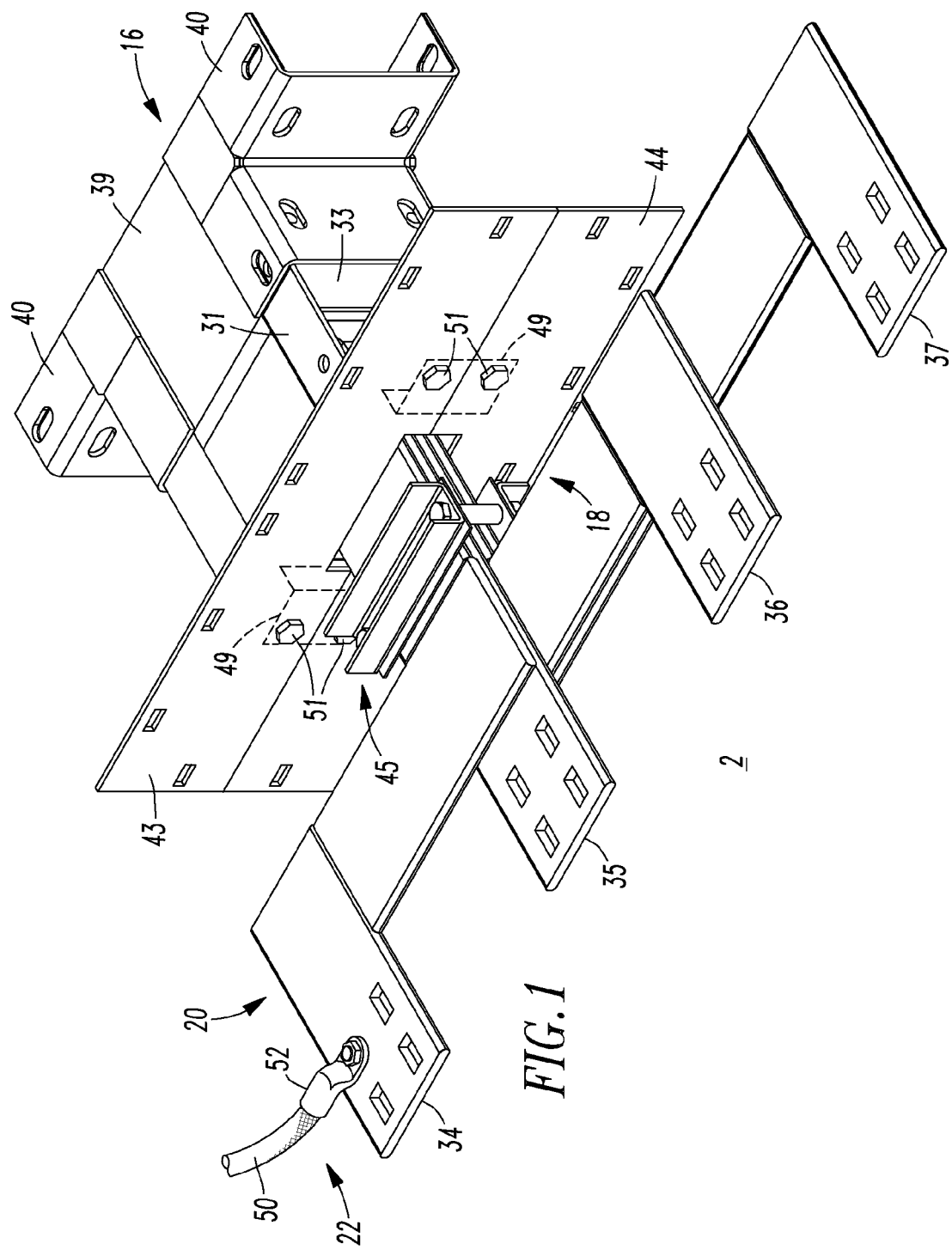
FIG. 1 is an isometric view of a tap apparatus for electrically interconnecting an electrical busway and switchgear in accordance with embodiments of the disclosed concept.

For purposes of illustration, embodiments of the disclosed concept will be described as applied to a panelboard, although it will become apparent that they could also be applied to any other known or suitable switchgear, such as an electrical enclosure (e.g., including, without limitation, any number of a panelboard; a meter center; a load center; an Integrated Facility Switchboard (IFS); an integrated set of electrical panels and transformers housed in a UL 891 switchboard structure; an electrical switching apparatus (e.g., without limitation, a main circuit breaker of an IFS; circuit switching devices and circuit interrupters such as circuit breakers, contactors, motor starters, motor controllers and other load controllers)).

Directional phrases used herein, such as, for example, left, right, front, back, top, bottom and derivatives thereof, relate to the orientation of the elements shown in the drawings and are not limiting upon the claims unless expressly recited therein.

As employed herein, the term "electrical bus" or "electrical bus member" means a substantially rigid or rigid conductor which carries or transfers voltage, current and/or power.

As employed herein, the term "electrical busway" refers to an assembly of electrical bus members housed within an elongated supporting structure such as, for example and without limitation, a rail structure. The electrical bus members receive electrical power from, for example, a utility or other suitable power source. The rail structure provides a supporting assembly and housing for the electrical bus members. See, for example, UL 857 and NEC, above.

As employed herein, the terms "fastener" and "fastening mechanism" refer to any suitable connecting or tightening mechanism expressly including, but not limited to, screws, bolts, nuts (e.g., without limitation, lock nuts) and combinations thereof.

As employed herein, the statement that two or more parts are "coupled" together shall mean that the parts are joined together either directly or joined through one or more intermediate parts.

As employed herein, the term "tap" refers to a point (e.g., without limitation, an end point; an intermediate point) in an electrical circuit, such as an electrical busway, where an electrical connection can be made.

As employed herein, the term "number" refers to the quantity one or an integer greater than one (i.e., a plurality).

Figure 7:
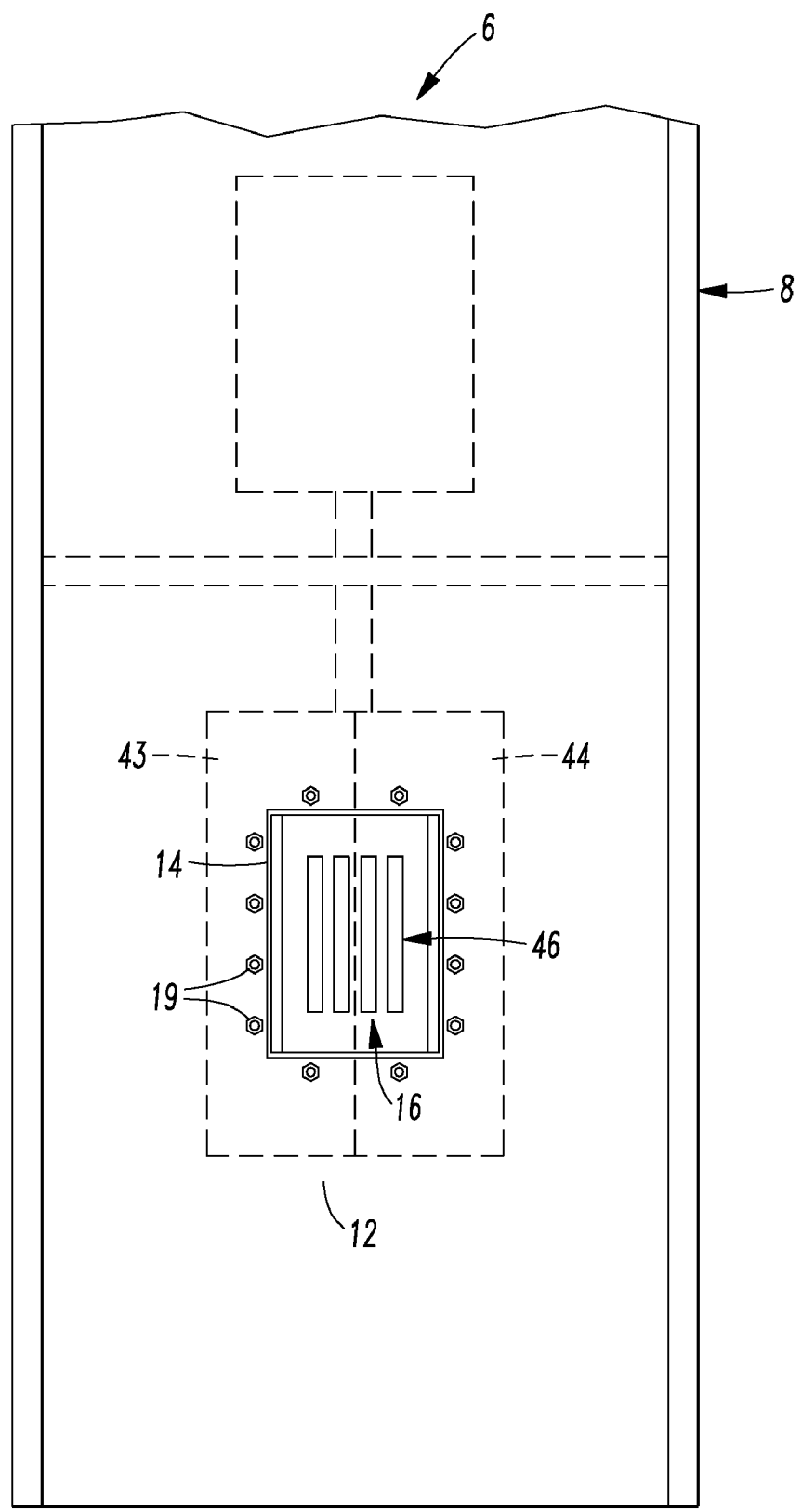
FIG. 7 is a side elevation view of the electrical enclosure of FIG. 6.
Figure 8:
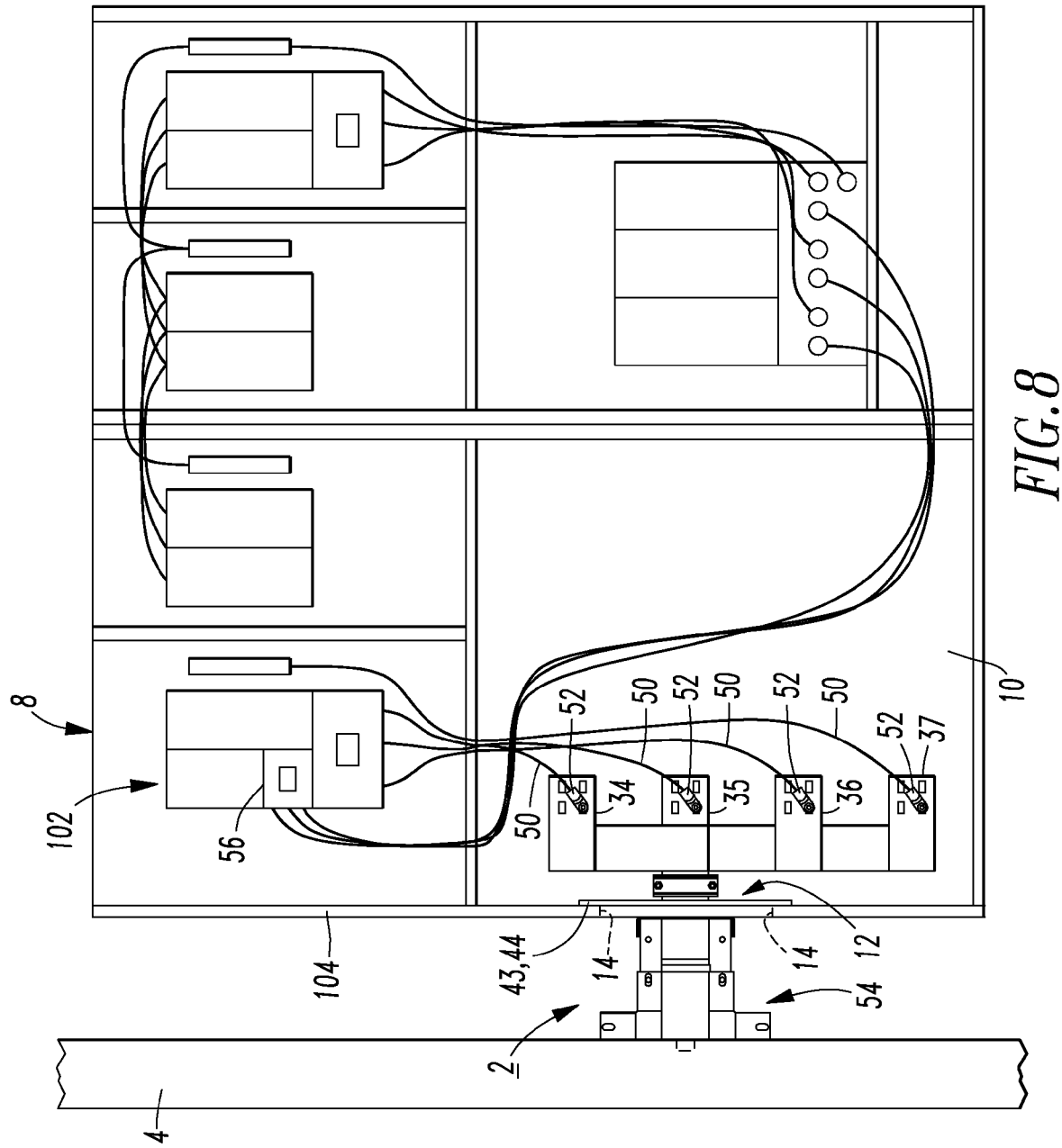
FIG. 8 is a simplified vertical elevation view of a system including a busway riser, the tap apparatus of FIGS. 1-5 and an electrical enclosure.

Referring to FIGS. 1-5, a tap apparatus 2 is shown. The tap apparatus 2 is for electrically interconnecting, for example, an electrical busway 4 (FIG. 8), and switchgear 6 (FIG. 6) and/or an electrical apparatus 102 (FIG. 8). The switchgear 6 includes an enclosure 8 having an interior 10 and a mounting portion 12 with an opening 14 (shown in hidden line drawing in FIG. 8) therethrough. The tap apparatus 2 includes a first portion 16 structured to electrically interconnect with the electrical busway 4 through the opening 14 of the mounting portion 12, a second portion 18 structured to be removeably coupled (e.g., by fasteners 19 (FIG. 7)) to the enclosure mounting portion 12 from the enclosure interior 10, and a third portion 20 including a flexible electrical connection 22 (shown in FIG. 6) structured to electrically interconnect with the switchgear 6 and/or electrical apparatus 102 (FIG. 8).

Figure 2:
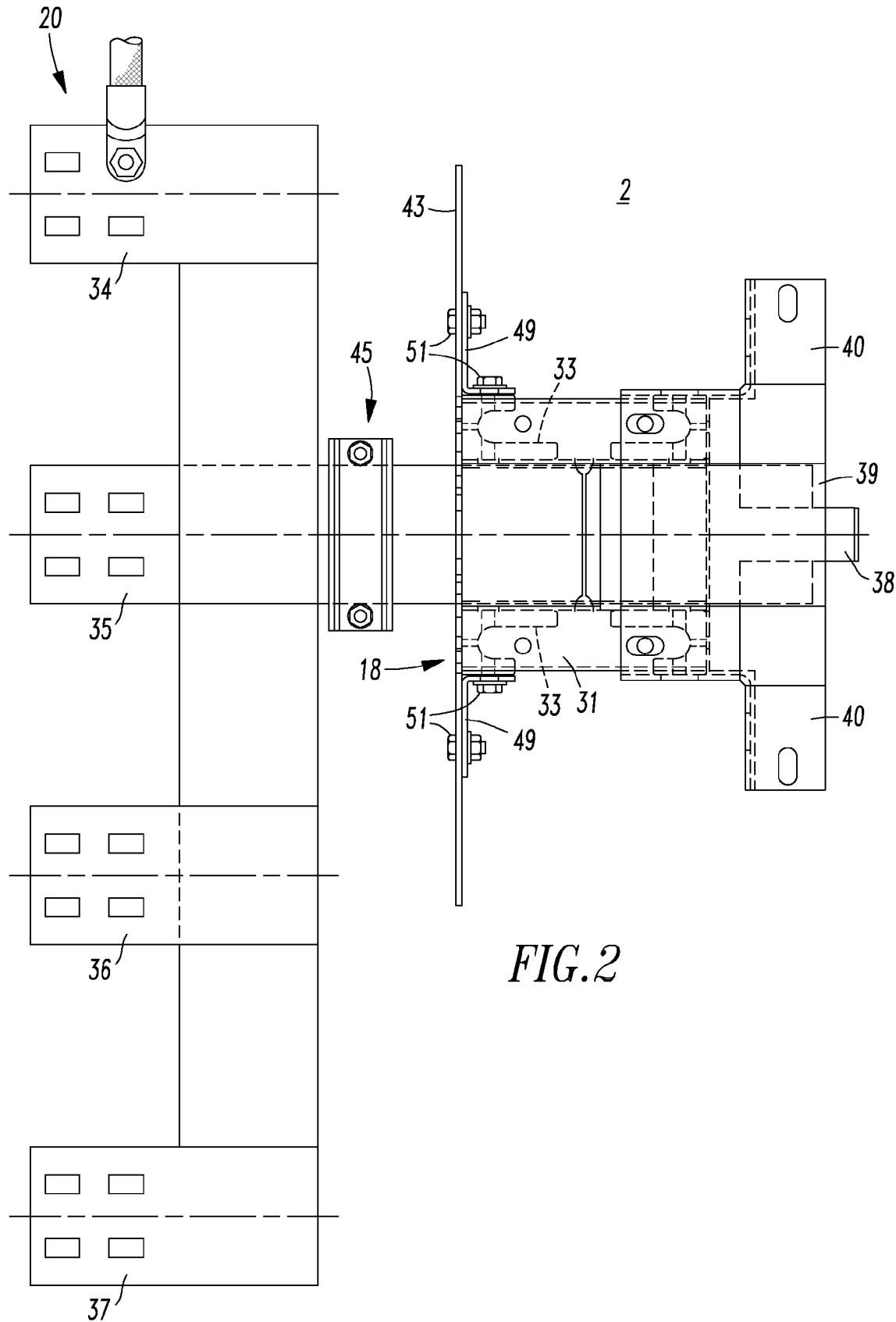
FIG. 2 is a plan view of the tap apparatus of FIG. 1.
Figure 3:
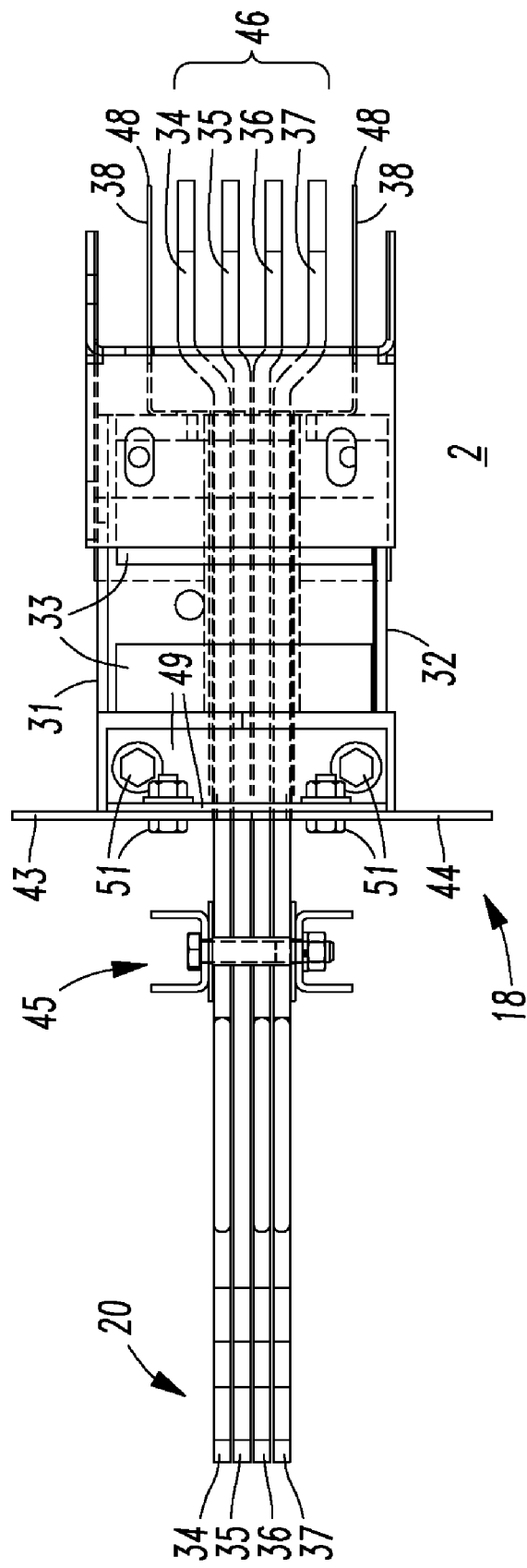
FIG. 3 is a vertical elevation view of the tap apparatus of FIG. 1.
Figure 4:
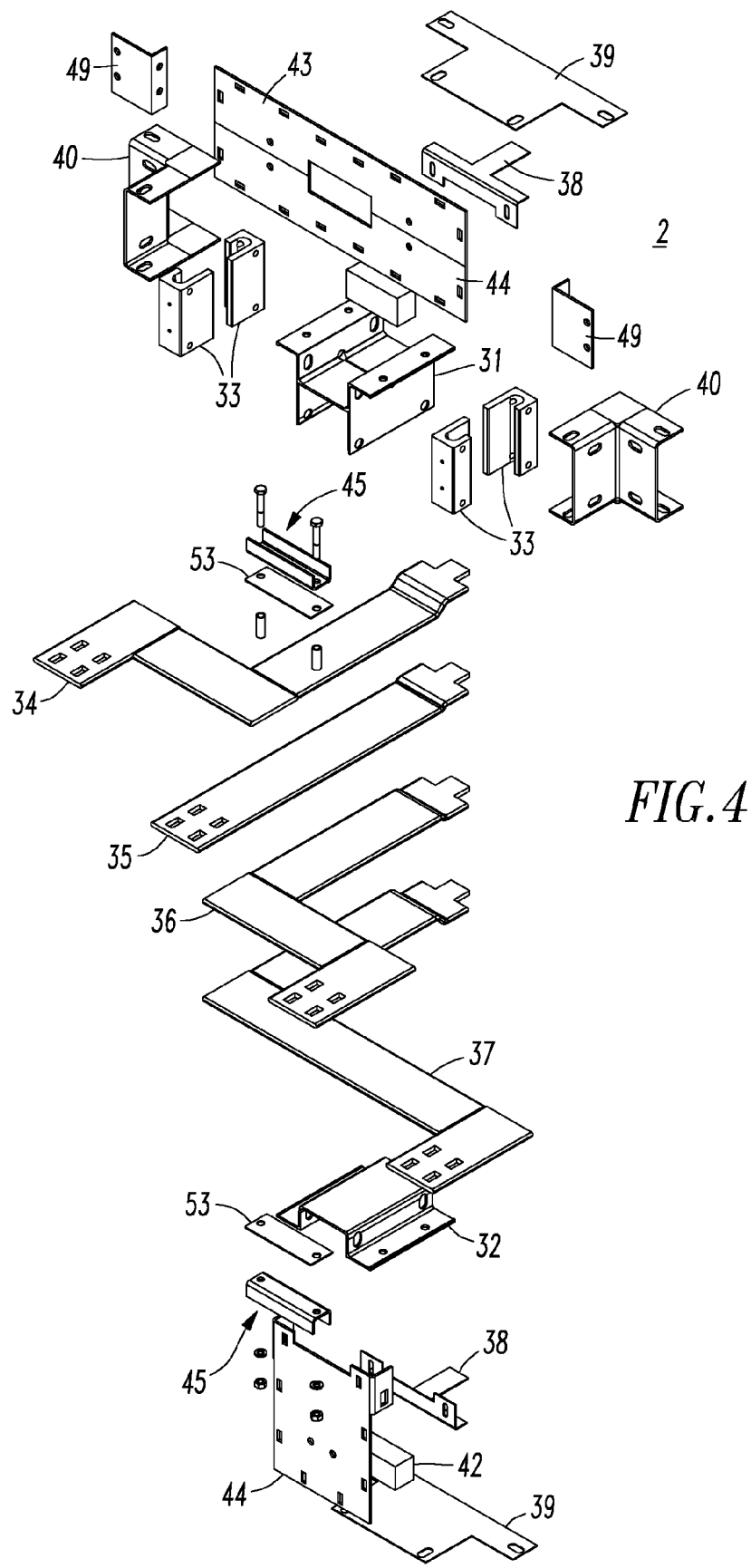
FIGS. 4 and 5 are exploded isometric views of the tap apparatus of FIG. 1.
Figure 5:
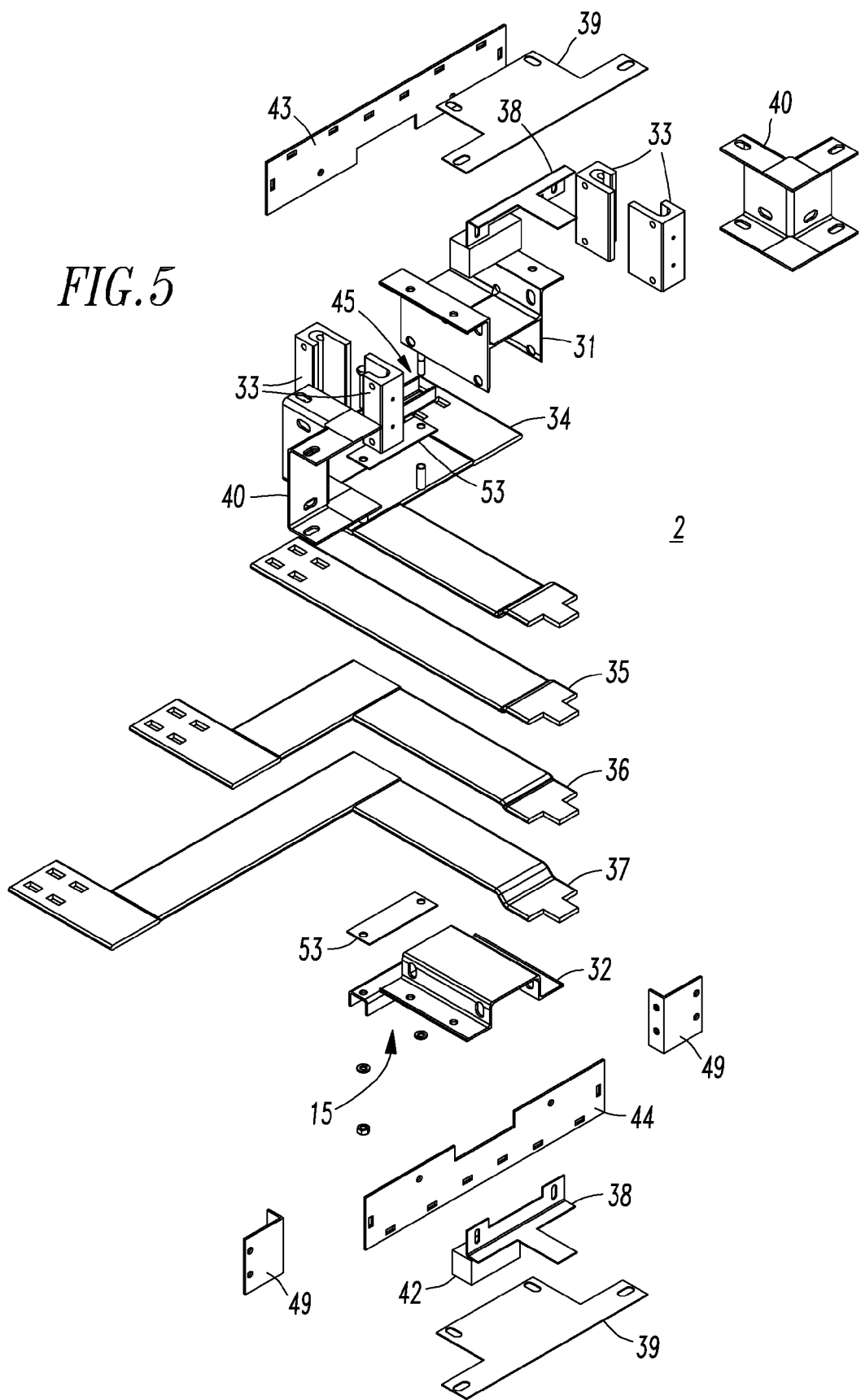

The example tap apparatus 2 includes a top housing 31, a bottom housing 32, four end blocks 33 (best shown in FIGS. 4 and 5), four bus bar assemblies 34,35,36,37, two external ground plates 38 (best shown in FIGS. 4 and 5), two covers 39 (both are shown in FIGS. 4 and 5), two cover assemblies 40, two gaskets 41,42 (shown in FIGS. 4 and 5), two mounting plates 43,44, and a flange bar clamp assembly 45. The mounting plates 43,44 are coupled to two respective end blocks 33 by L-shaped brackets 49 and fasteners 51, as best shown in FIGS. 2 and 3. The mounting plates 43,44 cover the enclosure opening 14 as best shown in FIGS. 7 and 8.

The four end blocks 33 (FIGS. 4 and 5) provide a conductive (e.g., grounded) path from the two covers 39 through the top and bottom housings 31,32 to the two mounting plates 43,44. The end blocks 33 also hold the two cover assemblies 40 in place. There is a busway formed by the four bus bar assemblies 34,35,36,37. This busway is symmetrical and employs two of the end blocks 33 on both sides to hold the two covers 39. The two covers 39 provide protection over the potentially live bus bar assemblies 34,35,36,37. Also, the second cover 39 provides for an additional ground path.

The top housing 31, bottom housing 32, end blocks 33, external ground plates 38, covers 39, cover assemblies 40, and mounting plates 43,44 can be made of any suitable material. Preferably, a suitable conductive material, such as, for example and without limitation, aluminum is employed. The bus bar assemblies 34,35,36,37 are made of a suitable conductive material, such as, for example and without limitation, copper or aluminum. The gaskets 41,42 are made of a suitable insulative material, such as, for example and without limitation, closed form rubber.

The top housing 31, bottom housing 32, end blocks 33, external ground plates 38, covers 39, cover assemblies 40, and mounting plates 43,44 are fastened or otherwise coupled together in the following manner. Each of the bus bar assemblies 34,35,36,37 preferably includes a suitable epoxy coating, which insulates it from the other bus bar assemblies and other grounded components of the tap apparatus 2 when clamped together by the flange bar clamp assembly 45. The flange bar clamp assembly 45 is insulated from the epoxy coated bus bar assemblies 34,35,36,37 by suitable insulators 53 (FIGS. 4 and 5). This epoxy coating also insulates the bus bar assemblies 34,35,36,37 from the top and bottom housings 31,32, the end blocks 33, the external ground plates 38, the covers 39, the cover assemblies 40, and the mounting plates 43,44. The bus bar assemblies 34,35,36,37 are sandwiched between the top and bottom housings 31,32, and also the flange bar clamp assembly 45. The top and bottom housings 31,32 are extruded shapes that are fastened together (e.g., using any suitable fasteners, such as bolts (not shown)). Preferably, the external ground plates 38 are suitably electrically connected to a suitable ground by a suitable electrical lug and conductor (not shown).

The first portion 16 of the tap apparatus 2 includes the ends 46 (FIGS. 3, 6 and 7) of the bus bar assemblies 34,35,36,37 and the ends 48 (FIG. 3) of the ground plates 38.

The second portion 18 of the tap apparatus 2 includes the top and bottom housings 31,32, the end blocks 33, the external ground plates 38, the covers 39, the cover assemblies 40, and the mounting plates 43,44, which are structured to be removeably coupled to the enclosure mounting portion 12 from the enclosure interior 10.

The number of gaskets 41,42 are structured to electrically isolate the first portion 16 from the second portion 18.

Figure 6:
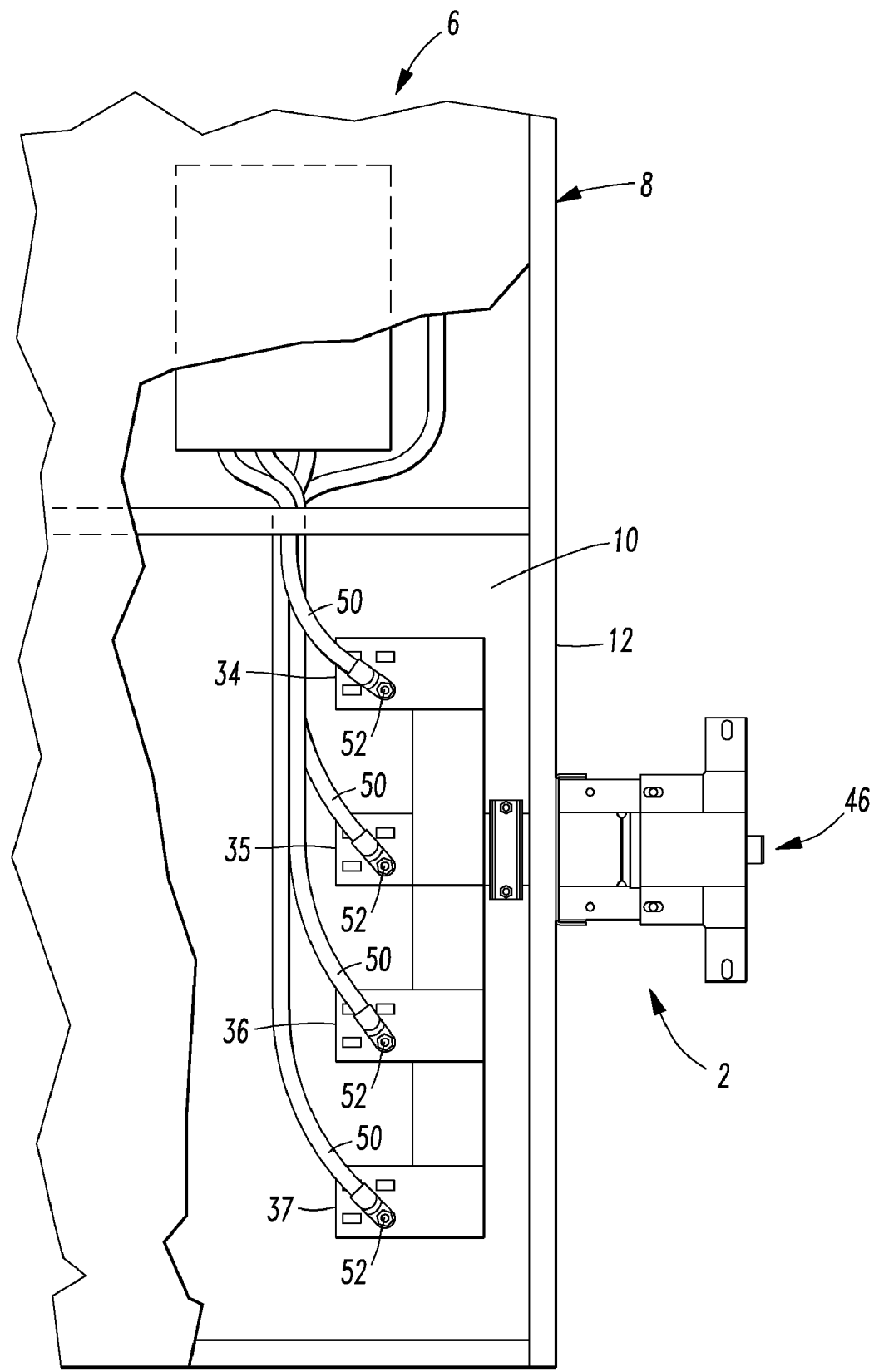
FIG. 6 is a vertical elevation view of an electrical enclosure including the tap apparatus of FIG. 1.

The third portion 20 of the tap apparatus 2 includes the plurality of rigid, insulated bus bar assemblies 34,35,36,37 and a plurality of flexible electrical conductors 50 (FIG. 6). The example third portion 20 also includes the flange bar clamp assembly 45 clamping together the rigid, insulated bus bar assemblies 34,35,36,37 to form a single structure. As shown in FIGS. 1 and 6, the example third portion 20 further includes, for each of the bus bar assemblies 34,35,36,37, a mechanical lug 52 (only one is shown in FIG. 1) electrically interconnected with the switchgear 6 by one of the flexible electrical conductors 50 (only one is shown in FIG. 1).

The bus bar assemblies 34,35,36,37 are electrically connected to the individual conductors (not shown) of the electrical busway 4 (FIG. 8) (e.g., without limitation, a busway riser) in the following conventional manner. A bridge joint 54 (FIG. 8) includes a series of stacked insulators and conductors (not shown). The ends 46 (FIG. 3) of the bus bar assemblies 34,35,36,37 are inserted into the bridge joint 54 between the bridge joint conductors, which are insulated between the stacked insulators. The bridge joint 54 also receives a number of the ends 48 of the ground plates 38.

Referring to FIG. 8, a system 100 includes the electrical busway 4, the electrical enclosure 8 enclosing the electrical apparatus 102 (e.g., without limitation, a 480 V panelboard, transformer, main circuit breaker and disconnect), and the tap apparatus 2 (FIGS. 1-5) electrically interconnecting the electrical busway 4 (e.g., without limitation, a busway riser) and the electrical apparatus 102. The electrical enclosure 8 includes the interior 10 and the mounting portion 12 (e.g., without limitation, a portion of the side 104 of the electrical enclosure 8) with the opening 14 (FIG. 7) therethrough. The opening 14, which is covered by the mounting plates 43,44, permits the first portion 16 (FIG. 1) to pass therethrough. In this example, the electrical enclosure 8 is an Integrated Facility Switchboard (IFS).

The second portion 18 (FIG. 1) is preferably structured to be uncoupled from the electrical enclosure mounting portion 12 of the electrical enclosure interior 10, in order to remove the entire tap apparatus 2, position the electrical enclosure 8 with respect to the fixed electrical busway 4, and recouple the second portion 18 to the mounting portion 12 from the electrical enclosure interior 10. This is made possible by the flexible power cables 50.

EXAMPLE 1

As shown in FIG. 8, the example bridge joint connection tap apparatus 2 enters the example IFS switchboard 8 from the side. The tap apparatus 2 is structured to be removeably coupled to the inside of the IFS switchboard 8, rather than being fixedly coupled, for example, to the outside of a conventional residential meter stack. This permits, for example, a contractor to remove the entire internal tap apparatus 2, position the IFS switchboard 8, and then re-install the internal tap apparatus 2 to the electrical busway 4. The resulting system is rated, for example and without limitation, for use up to 800 A.

As shown in FIGS. 6 and 8, the example third portion 20 (FIG. 1) of the tap apparatus 2 is structured to receive the mechanical lugs 52 that enable the tap apparatus 2 to be electrically connected by the flexible electrical conductors 50 to, for example, the main circuit breaker 56 (e.g., without limitation, 480V) of the IFS switchboard 8.

Portions 16,18,20 of FIG. 1 form the tap apparatus 2. When installed, the portion 18 and, thus, the entire tap apparatus 2, is removably coupled to the mounting portion 12 of the switchgear 6 (FIG. 6).

EXAMPLE 2

Although FIGS. 6 and 8 show entry on a particular side of the example IFS switchboard 8, it will be appreciated that the disclosed tap apparatus 2 can provide entry on the opposite side or on the back thereof. Although not required, the front of the example IFS switchboard 8 is used for a door (not shown).

EXAMPLE 3

The disclosed tap apparatus 2 provides a removable tap that can advantageously be pre-positioned at a suitable location within the example electrical enclosure 8 (e.g., without limitation, the example IFS switchboard). The removable tap is installed from inside the electrical enclosure 8 in order to aid installation. Furthermore, the example tap apparatus 2 employs four lugs 52 and four flexible power cables 50 for internal electrical connections within the electrical enclosure 8. This permits the tap apparatus 2 to mount from the inside of the electrical enclosure 8 after this electrical enclosure has already been set in place proximate the electrical busway 4.

EXAMPLE 4

It will be appreciated that the example electrical enclosure 8 can include a wide range of electrical equipment (e.g., without limitation, a number of transformers (not shown); other electrical equipment (not shown)).

EXAMPLE 5

The sides of the electrical enclosure 8 (where the tap apparatus 2 mounts) can be customized after a busway project is designed. This allows for freedom of design (within suitable limits) front to back and top to bottom to correspond to the project-specified location of the busway joint and, therefore, the tap connection. Hence, the entire contents of the electrical enclosure 8 can be pre-fabricated, brought into place at the project, and then "plugged" in as a unit.

EXAMPLE 6

The disclosed tap apparatus 2 permits any suitable number of IFS switchboards to be "tapped" off of a single electrical busway 4. This provides a significant reduction in the footprint of the electrical enclosure 8, significantly decreases the installation time, and reduces the overall space requirements for a given electrical room.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A tap apparatus for electrically interconnecting an electrical busway and switchgear, said switchgear including an enclosure having an interior and a mounting portion with an opening therethrough, said tap apparatus comprising:
   a first portion structured to electrically interconnect with said electrical busway through the opening of said mounting portion;
   a second portion structured to be removeably coupled to the mounting portion of said enclosure from the interior of said enclosure;
   a third portion including a flexible electrical connection structured to electrically interconnect with said switchgear; and wherein a number of gaskets are structured to electrically isolate said first portion from said second portion.

2. A system comprising:

an electrical busway;

an electrical enclosure enclosing an electrical apparatus, said electrical enclosure including an interior and a mounting portion with an opening therethrough;

a tap apparatus electrically interconnecting said electrical busway and said electrical apparatus, said tap apparatus comprising:
- a first portion electrically interconnected with said electrical busway through the opening of said mounting portion,
- a second portion removeably coupled to the mounting portion of said electrical enclosure from the interior of said electrical enclosure,
- a third portion including a flexible electrical connection electrically interconnected with said electrical apparatus; and wherein a number of gaskets electrically isolate said first portion from said second portion.

3. A system comprising:

an electrical busway;

an electrical enclosure enclosing an electrical apparatus, said electrical enclosure including an interior and a mounting portion with an opening therethrough;

a tap apparatus electrically interconnecting said electrical busway and said electrical apparatus, said tap apparatus comprising:
- a first portion electrically interconnected with said electrical busway through the opening of said mounting portion,
- a second portion removeably coupled to the mounting portion of said electrical enclosure from the interior of said electrical enclosure,
- a third portion including a flexible electrical connection electrically interconnected with said electrical apparatus; and wherein said second portion comprises a number of covers and a number of cover assemblies.

4. The system of claim 3 wherein said second portion further comprises a number of mounting plates.

5. The system of claim 4 wherein said number of mounting plates are removably coupled to the mounting portion of said electrical enclosure from the interior of said electrical enclosure.

6. The system of claim 5 wherein the mounting portion of the electrical enclosure is a portion of a side of said electrical enclosure.

* * * * *